(12) United States Patent
Corghi et al.

(10) Patent No.: US 7,100,660 B2
(45) Date of Patent: Sep. 5, 2006

(54) BEAD RELEASE DEVICE FOR TIRE REMOVAL MACHINES

(75) Inventors: Remo Corghi, Correggio (IT); Giulio Corghi, Correggio (IT)

(73) Assignee: Corghi S.p.A., Correggio (IT)

( * ) Notice: Subject to any disclaimer, the term of this patent is extended or adjusted under 35 U.S.C. 154(b) by 221 days.

(21) Appl. No.: 10/702,451

(22) Filed: Nov. 7, 2003

(65) Prior Publication Data

US 2005/0077013 A1 Apr. 14, 2005

(30) Foreign Application Priority Data

Oct. 14, 2003 (IT) .............................. 2003A0095

(51) Int. Cl.
*B60C 25/00* (2006.01)

(52) U.S. Cl. .................................................. 157/1.28

(58) Field of Classification Search ............... 157/1.17, 157/1.22, 1.24, 1.28, 1.26
See application file for complete search history.

(56) References Cited

U.S. PATENT DOCUMENTS 3,742,999 A * 7/1973 Myers, Jr. .................. 157/1.28
5,381,843 A * 1/1995 Corghi ....................... 157/1.28
2003/0150565 A1* 8/2003 Gonzaga ..................... 157/1.28

FOREIGN PATENT DOCUMENTS

EP 0 512 595 A1 11/1992
EP 1 026 017 A2 8/2000

* cited by examiner

*Primary Examiner*—Jacob K. Ackun, Jr.
(74) *Attorney, Agent, or Firm*—Browdy and Neimark, PLLC

(57) ABSTRACT

A bead release device (1) for tire removal machines (100), comprising:
  a movable arm (2) having a first end (3) removably associated with a base (4);
  a positionable bead release tool (6) associated with a second end (5) of the arm (2) distant from said first end (3), to release the tire bead of a wheel resting on a support surface (8);
  manipulator means (10) for moving said arm (2) within a plane of swivel of the arm (2) lying perpendicular to the base (4);
said first end (3) of the arm (2) being associated with the base (4) by means of a locking and release system (12) enabling said first end (3) of the arm (2) to undergo movement, said movement rotating said plane of swivel of the arm (2) about an axis of rotation lying within said plane of swivel and positioned substantially perpendicular to said base (4).

5 Claims, 5 Drawing Sheets

BEAD RELEASE DEVICE FOR TIRE REMOVAL MACHINES

FIELD OF THE INVENTION

The present invention relates to a bead release device for tire removal machines, in accordance with the introduction to claim 1.

More particularly, the present invention relates to a bead release device, for detaching a tire bead from the corresponding motor vehicle wheel rim (wheel rim with tire mounted), which is able to operate within a wide range of wheel rim diameters.

Tires are mounted on and demounted from their respective wheel rims by tire removal machines, which will not be described in greater detail hereinafter as they are already known to the expert of the art.

It is also well known that to demount the tire the bead, i.e. the reinforced edge of the tire, it must previously be detached from the bead retention flange of the wheel rim.

Said detaching operation is carried out by devices, known as bead release devices, with are generally located on the tire removal machine.

These bead release devices are usually positioned on a lateral portion of the base of the tire removal machine and comprise a horizontally extending movable arm having one end hinged to said base on a vertical axis of rotation.

The arm is also provided with a bead release tool, commonly known as a bead release blade, associated with said movable arm at the end distant from the hinged end.

On the base a support surface is present on which a portion of the wheel (wheel rim with mounted tire) from which the bead is to be released is rested.

The arm is moved about the vertical axis of rotation by swivel means, such as a pneumatic cylinder-piston unit interposed between the arm and the base.

The cylinder-piston unit enables the arm to rotate about the axis of rotation within a plane of swivel normal thereto to move the blade away from or towards the wheel resting on the support surface, to hence release the bead.

Tire bead release is accomplished in the following manner.

As the support surface is positioned vertically to the ground, the wheel is placed "standing up" on the ground with its axis of rotation perpendicular to the support surface so that the edge of the wheel rim rests against said support surface.

The arm is then brought close to the bead by operating the cylinder-piston unit such as to dispose the edge of the bead release blade in contact with the tire bead a short distance from the bead retention flange of the wheel rim.

Although the aforedescribed bead release devices of the known art perform the function for which they are provided, they present certain drawbacks and disadvantages.

These devices enable the bead to be effectively released from wheels having wheel rims with a diameter variable within a limited range, generally between 10" and 16".

In this respect, if bead release devices of the known art are used to release the bead of wheels having wheel rims with a diameter greater than the allowable maximum for correct operation, the blade edge does not rest completely and uniformly along the edge of the bead but only partially.

Consequently, the entire force exerted on the blade by the arm is concentrated on the small contact portion between the blade edge and the bead edge, with possible damage to the tire.

Essentially, the force exerted by the arm by means of the cylinder-piston unit is distributed over the contact portion between the blade edge and the bead edge.

Consequently, as the wheel diameter increases, the contact portion between the blade edge and the bead edge decreases, with an increase in the specific pressure exerted by the blade on the tire bead.

An often used expedient is to mount the bead release blade to rotate about an axis of rotation perpendicular to the arm axis and lying in the plane of swivel of the arm. This expedient allows the edge of the blade to undergo small adaptations to the bead edge, enabling wheels with wheel rims having a diameter greater by one inch than devices without this expedient to be operated on, however not without difficulty.

If devices of the known art are used for wheels with large-diameter wheel rims ($\geq 18"$) the operator is often obliged to act in an incorrect manner. In this respect, as the edge of the blade does not reach the bead edge with these wheels, the operator tends to move the wheel towards the axis of rotation of the arm in order to bring the region between the bead and the bead retention flange close to the edge of the blade, to effect bead release.

In moving the wheel towards the axis of rotation, the wheel web lies above the support surface.

Unfortunately besides causing possible damage to the bead, because of the exerted thrust which is concentrated on the angular edge of the blade, this manner of operation risks compromising the planarity between the wheel and the support surface if the wheel web has a particularly convex shape, i.e. projecting outwards from the plane in which the edge of the wheel rim lies.

Said problems evidently increase considerably if to detach a tire bead the blade has to be positioned on different circumferential regions of the bead, as is necessary when the bead is strongly held by the respective bead retention flange.

Currently, the existence of automobiles fitted with wheels with wheel rims having a diameter varying from 10" to 24" and more means that tire removal machines must be used having a bead release device able to operate within a very wide diameter range.

There is therefore a strongly felt need for a bead release device for tire removal machines which is able to operate effectively and properly on a very wide wheel rim diameter range while preserving the integrity of the bead even of those tires having a diameter close to the upper end of the working range.

SUMMARY OF THE INVENTION

The object of the present invention is to provide a bead release device for tire removal machines which has structural and functional characteristics such as to satisfy the aforesaid requirements while at the same time obviating the stated drawbacks of the known art.

This object is attained by a bead release device for tire removal machines in accordance with claim 1.

The dependent claims define preferred and particularly advantageous embodiments of the bead release device of the invention.

Further characteristics and advantages of the invention will be apparent on reading the ensuing description provided by way of non-limiting example, with the aid of the figures illustrated in the accompanying drawings.

DESCRIPTION OF THE PREFERRED EMBODIMENT

Figure 1:
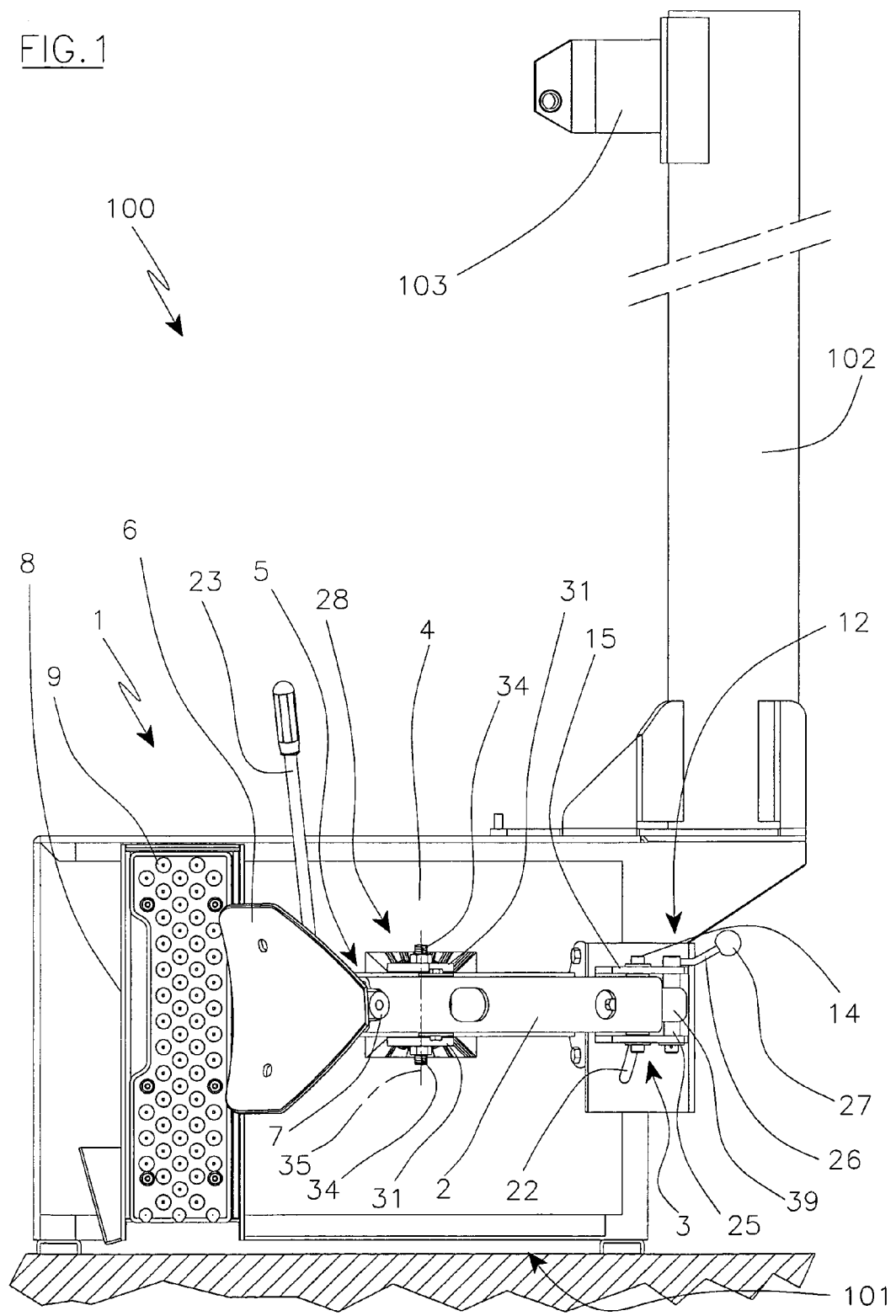
FIGS. 1 and 2 are a side view of a bead release device for tire removal machines shown in a first and second operative position respectively, according to the present invention.

With reference to said figures, the reference numeral 1 indicates overall a bead release device for tire removal machines 100 in accordance with the present invention.

In the present description, explicit reference is made to a tire removal machine on which the bead release device 1 is mounted, without thereby intending to limit the use of said device associated with tire removal machines 100.

Said machines 100 are of known type and will therefore not be described in particular detail hereinafter.

The device 1 comprises a movable arm 2 having a first end 3 removably associated with a base 4.

In the present invention the term "base" means the vertical lateral panel of the lower frame 101 of the tire removal machine 100.

From the lower frame 101 there upwardly extends a vertical column 102 carrying the support and positioning means 103 for the typical tire removal tool of the known art.

A bead release tool 6, commonly known as a blade, and positionable about a transverse axis 7, is connected to the arm 2, by means known to the art, at a second end 5 distant from said first end 3.

The bead release tool 6 is provided with a lever 23 fitted with a handgrip which enables an operator to position the edge of the tool 6 on the bead of a tire of a wheel resting on a support surface 8.

A rubberized pad 9 is fixed to the wheel support surface 8 in accordance with the known art.

The wheel support surface 8 extends onto that portion of the base 4 in front of the bead release tool 6 as a surface sufficient to receive that wheel portion concerned in the bead release.

As bead release requires a rather large force, of the order of 1500 kg, the arm 2 is made to approach and withdraw from the bead of the tire by manipulator means.

Figure 4:
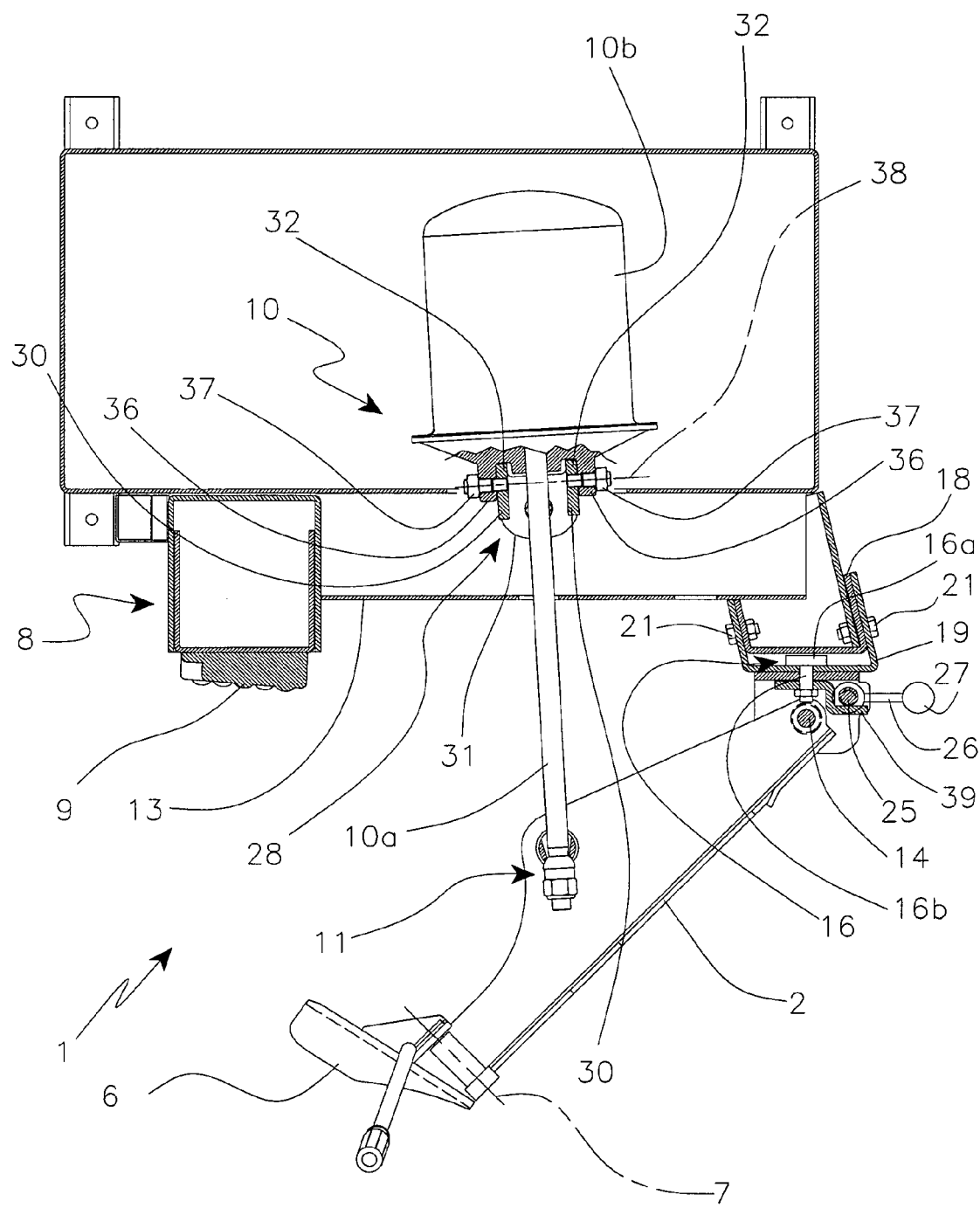
FIG. 4 is a horizontal section through the device of the present invention.

Advantageously, the function of said manipulator means is performed by a pneumatic cylinder-piston unit 10 having its piston rod 10a associated at one end with a central region of the arm by mutual coupling means 11 of the known art, and its jacket 10b is supported within the base 4 (FIG. 4).

The cylinder-piston unit 10 rotates the arm 2 within a plane of swivel perpendicular to the base 4.

Essentially, whereas the base 4 is disposed vertically, the plane of swivel lies horizontally or inclined with respect to the ground.

According to a preferred embodiment of the present invention, the first end 3 of the arm is removably associated with the base 4 by a locking and release system 12.

Specifically, on the base 4 there is a horizontally extending box casing 13 of elongate shape (FIG. 4), on the opposite ends of which the vertically extending support surface 8 and the locking and release system 12 are respectively located.

Figure 2:
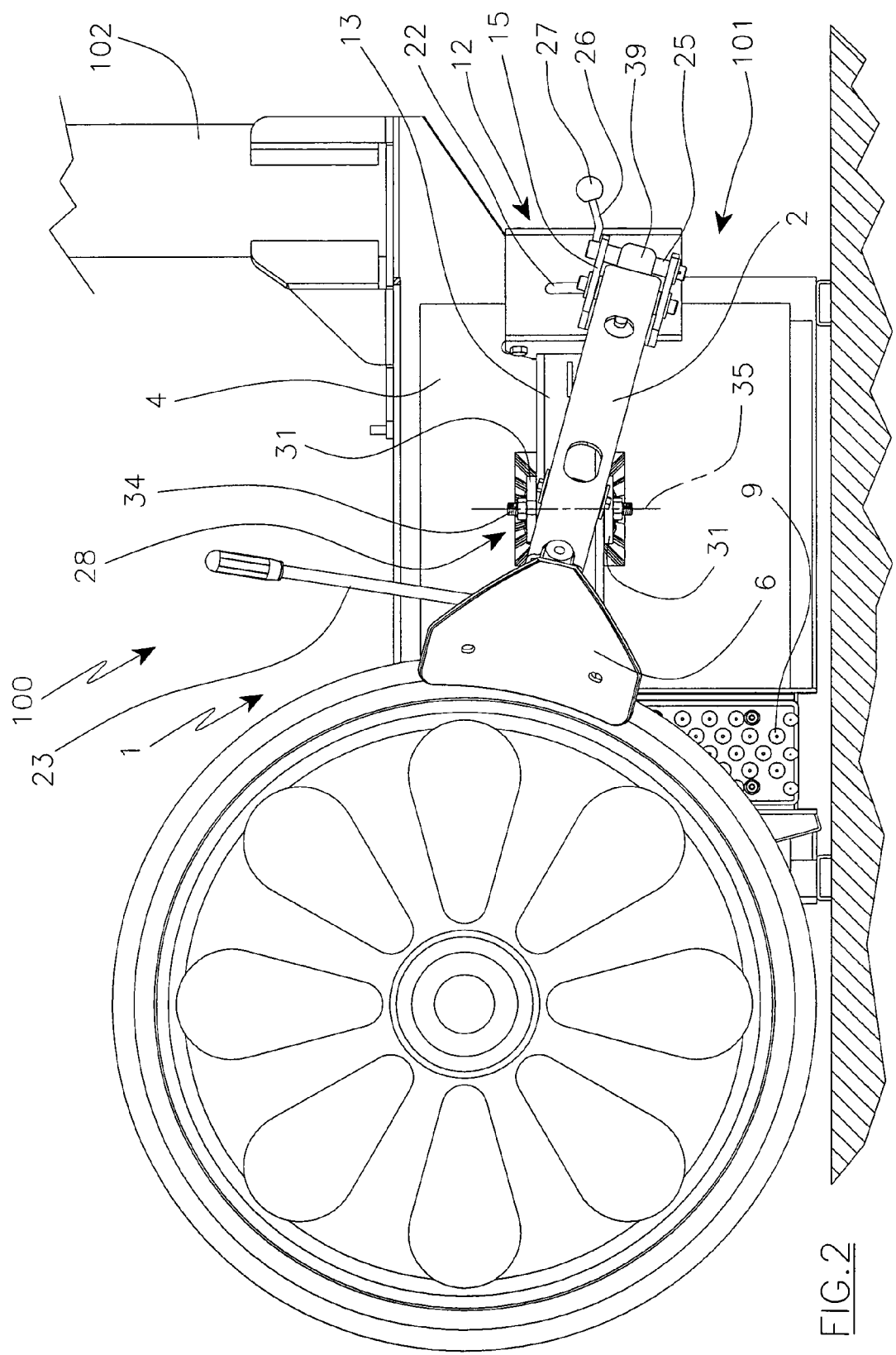

In practice, the locking and release system 12 is rotatably connected to the first end 3 of the arm 2 by a pin 14 positioned on the first end of the arm, the pin 14 being associated with the base 4 via the box casing 13 (FIGS. 2 and 4), which is consequently interposed between said locking system 12 and the base.

The arm 2 swivels about the axis of the pin 14 positioned on the first end 3 of the arm.

The locking and release system 12 comprises a fork 15 extending from the box 13 and connected to the first end 3 of the arm 2 via the pin 14 about which the arm 2 is free to rotate.

With said fork 15 (FIG. 5) a slider 16 is slidingly associated, to slide within a slide chamber 17 provided between two superposed U-pieces, namely a first U-piece 18 and a second U-piece 19.

One side of the first U-piece 18 is associated with a prolongation of the base 4, the other side being associated with the box casing 13.

The second U-piece 19 is associated with the first lower U-piece 18 by means of bolts 21 positioned on the sides, but leaving a space between the first and second U pieces, said space forming the slide chamber 17.

In the second U-piece 19 an arched slot 22 (FIG. 3) is provided, within which the slider 16 can freely slide.

The slider 16 (FIG. 5) presents an inverted T cross-section with its flat base 16a inserted in the chamber 17 and its longitudinal portion 16b passing through the slot 22 of the second U-piece 19 and through a hole provided in the fork 15.

A plate element 39 of S profile is present within the fork and comprises a hole through which the longitudinal portion 16b of the slider 16 passes.

The free end of the longitudinal portion 16b of the slider 16 is provided with a thread on which a nut 24 is screwed to maintain the plate element 39 and the fork 15 irremovably joined together.

Essentially, when the slider 16 is made to slide within the chamber 17, it drags with it the fork 15, the plate element 39, and the arm 2 rotatably connected to the fork 15 by the pin 14.

Figure 3:
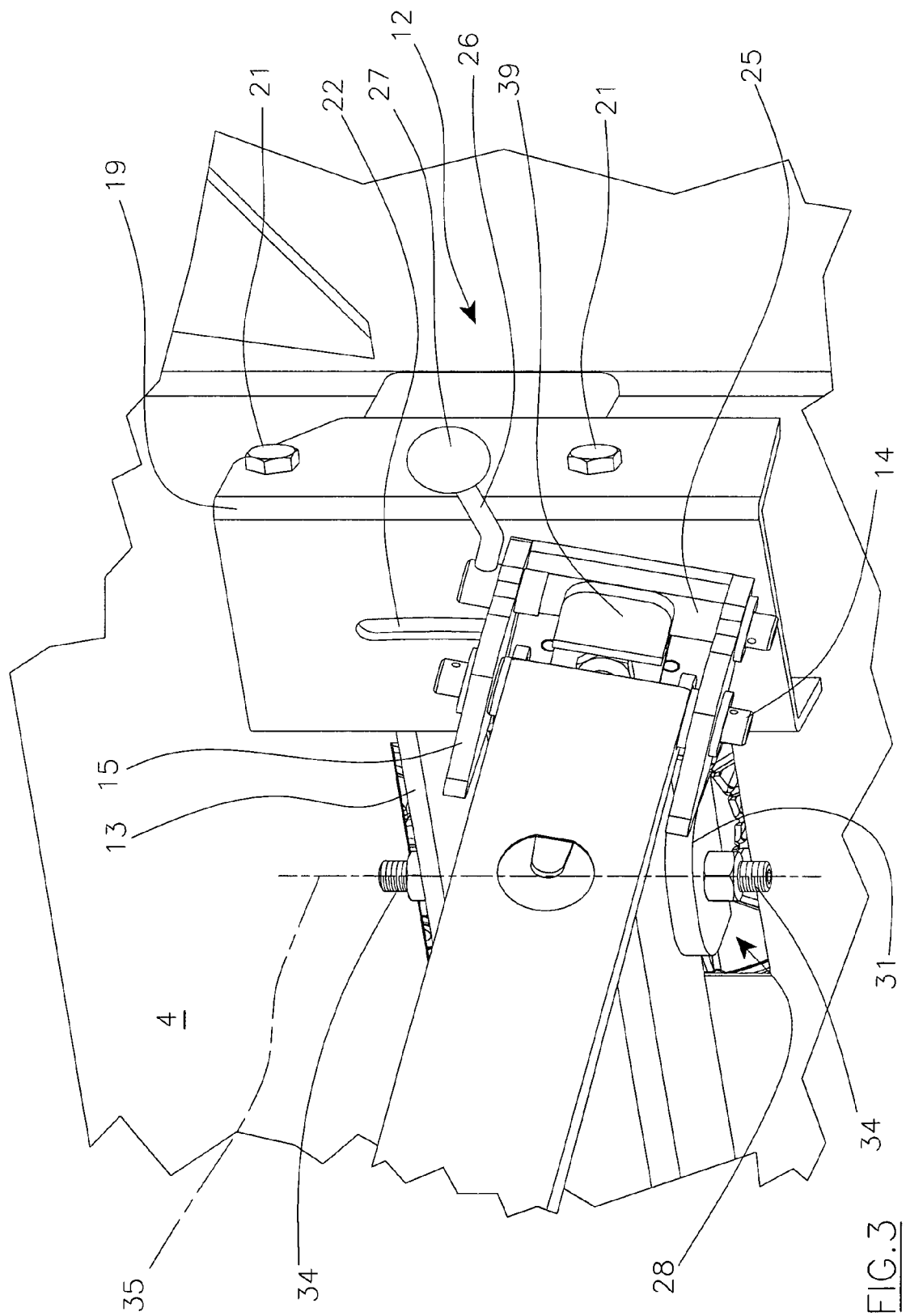
FIG. 3 is a detail of FIG. 2 on an enlarged scale.

The slider 16 is limited to sliding along the slot 22 (FIG. 3).

The locking and release system 12 further comprises a cam 25 disposed parallel to the axis of the pin 14 and acting on the plate element 39.

The cam 25 is provided with a lever 26 terminating with a knob 27 on which an operator can act to move the cam 25 from a locking position to a release position and vice versa.

When the cam 25 is in its locking position, it thrustingly abuts against the plate element 39 to prevent the slider 16 from sliding within the slot 22, whereas when the cam 25 is in its release position, the thrust of the cam on the plate element 39 ceases and the slider 16 is free to slide within the slot 22.

Figure 5:
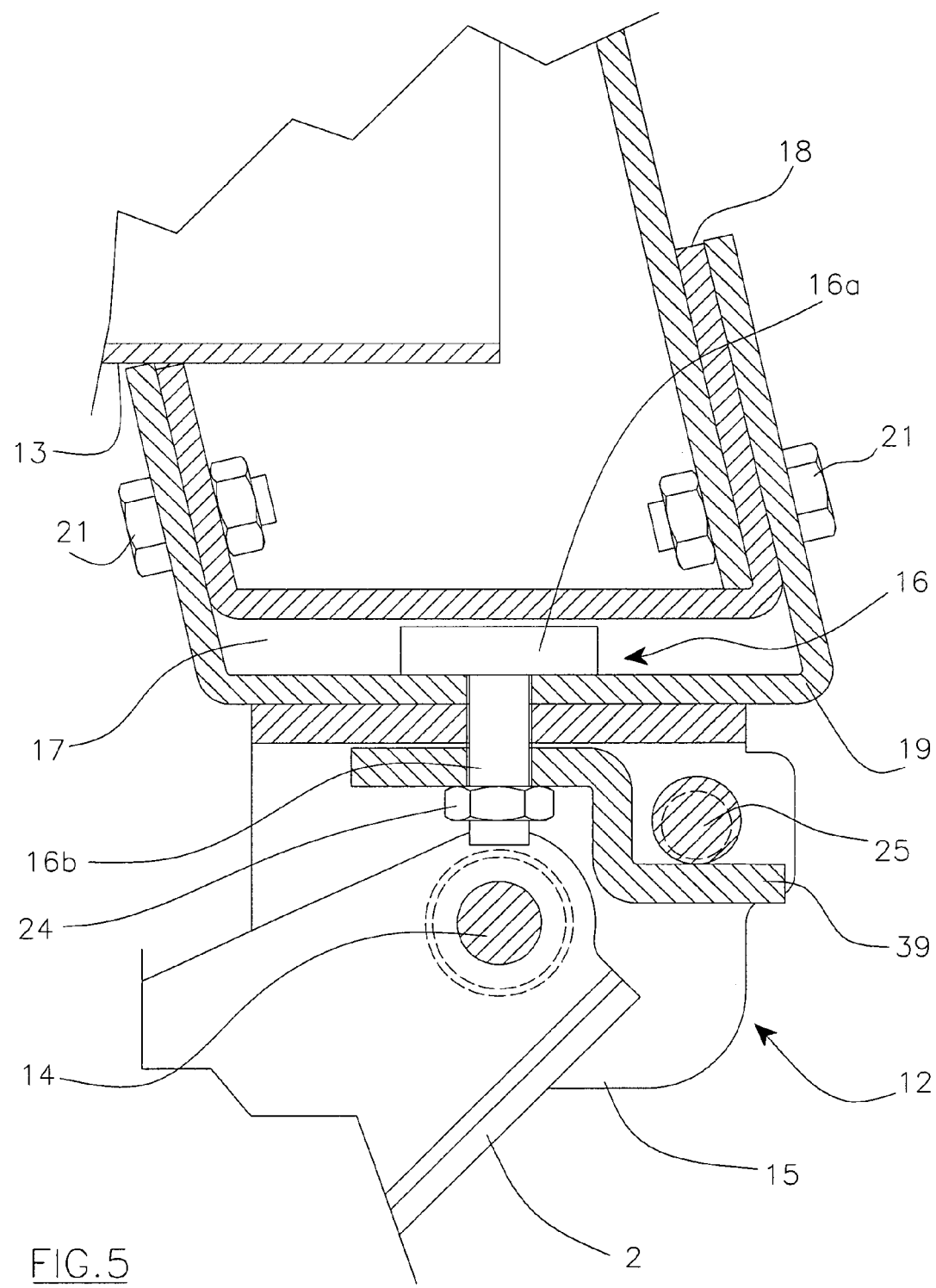
FIG. 5 is a detail of the section of FIG. 4, on an enlarged scale.

When in its locked state, the flat base 16a of the slider 16, slidingly inserted into the slide chamber 17, abuts against the inner surface of the second U-piece 19 to prevent the first end 3 of the arm 2 from moving relative to the base 4 (FIG. 5).

When in its released state, the flat base 16a of the slider 16, slidingly inserted into the slide chamber 17, is free to slide, by virtue of the gap present between the lower surface of the upper U-piece 19 and the flat base 16a of the slider 16.

This enables the arm 2 to be moved.

This movement is guided by the slider 16, which is limited to sliding within the slot 22 and by the axis of the rod 10a of the cylinder piston unit 10, which is the axis of rotation of the plane of swivel of the arm 2, said plane of swivel being positioned substantially perpendicular to said base 4.

In the illustrated example of the present invention, the axis of rotation of the plane of swivel coincides with the axis of the piston rod 10*a* of the cylinder-piston unit 10.

Essentially, the plane within which the arm 2 acts is made to rotate about the piston rod 10*a* of the cylinder-piston unit 10 by moving the second end 5 of the arm 2, and by sliding the slider 16 within the slot 22 when the cam 25 is in its release position.

Having found the optimum point of operation of the bead release device 1, the cam 25 is set in the locking position.

By virtue of this rotation of the plane of swivel of the arm 2 about the piston rod 10*a* of the cylinder-piston unit 10, the bead release tool 6, associated with the second end 5 of the arm 2, can effectively release the bead from automobile wheels with wheel rims of large diameter ($\geqq 22"$). In practice, the plane of swivel of the arm 2 is brought into proximity to the central axis of the wheel holding the tire from which the bead is to be detached.

It should be noted that the optimum condition for effecting bead release is that in which the plane of swivel of the arm 2 passes through the central axis of the wheel when suitably resting on the support surface 8.

To enable the piston rod 10*a* of the cylinder-piston unit 10 to operate in an optimum manner, it should undergo small oscillations which follow the rotation of the plane of swivel of the arm 2, when this plane is rotated to detach the bead of tires mounted on large-diameter wheel rims.

According to a preferred embodiment of the present invention, the cylinder-piston unit 10 is removably associated with the base 4 by means of a box joint 28 (FIG. 4).

Said joint 28 consists of a plate 29 provided with an aperture at its center, a first pair of sidepieces 30 and a second pair of sidepieces 31, these pairs being mutually opposing and projecting perpendicularly to said plate 29.

The sidepieces of said first pair 30 comprise two appendices 32.

Essentially, the plate 29 of the joint 28 is associated with the base 4, with the sidepieces 30 and 31 facing the arm 2 such as to enable the piston rod to pass through the central aperture of the plate 29.

The first pair of sidepieces 30 is entirely contained within the box casing 13, whereas the second pair of sidepieces 31 lies on the outside of the side walls of the box casing 13, (FIG. 3).

In the second pair of sidepieces 31 (FIG. 3) two holes are provided through which there are inserted two pins 34 rigid with the box 13 and coaxial with a first axis 35 extending substantially perpendicular to the plane of swivel of the arm 2.

Said pins 34 enable the joint 28 and the-cylinder-piston unit 10 connected thereto to rotate about the first axis 35. This enables the piston rod 10*a* of the cylinder-piston unit 10 to lie within said plane of swivel while the arm is being moved away from and towards the base 4.

The appendices 32 of the first pair of sidepieces 30 of the joint 28 are embraced by two tangs 36 extending from the end of the jacket 10*b* of the cylinder-piston unit 10.

Each tang 36 is provided with a threaded through hole through which a screw 37 is screwed, the threadless end of which becomes inserted into a hole provided in each of the two appendices 32.

The two screws are coaxial with a second axis 38 extending perpendicularly to the first axis 35 and substantially parallel to the plane of swivel of the arm 2.

In practice the first and the second axis 35 and 38 form a cross. Said screws 37 enable the piston rod 10*a* of the cylinder-piston unit 10 to rotate about the second axis 38.

This enables the piston rod 10*a* of the cylinder-piston unit 10 substantially to lie within said plane of swivel during the movement of the first end 3 and the second end 5 of the arm 2.

The rotations about said first and second axis can take place simultaneously, ensuring that the piston rod 10*a* can always follow the movement of the arm 2.

As will be apparent from the description, the bead release device for tire removal machines according to the present invention satisfies the requirements and overcomes the drawbacks stated in the introduction to the present description with reference to the known art.

In this respect, the bead release device of the present invention accomplishes bead release for tires within a very wide range of wheel rim diameters.

Moreover, said device achieves bead release with greater efficiency and safety, in that the arm swivel plane passes about the central axis of the wheel holding the tire of which the bead is to be released, when this wheel is rested on the support surface for bead release.

Numerous modifications and variations can be made to the aforedescribed bead release device for tire removal machines by an expert of the art in order to satisfy specific contingent requirements, provided that they lie within the scope of protection of the invention, as defined by the following claims.

What is claimed is:

1. A bead release device of a tire removal machine for disengaging a bend of a tire from a rim thereof, comprising:
   a vertical wheel support surface located on a vertical base;
   a movable arm rotatable in a swivel plane perpendicular to a vertical wheel support surface, said arm having a first end pivotally engaged to the base, and a second end supporting a bead release tool in front of the vertical wheel support surface;
   a cylinder piston unit connecting the base and a central portion of said arm in the swivel plane that moves the bead release tool toward and away from the bead of the tire;
   wherein said first end of the arm is engaged to the base by means of a locking and release system which slides in a curved slot fixed to the base, and said center portion of said arm is rotatably engaged to an end of a cylinder piston of said cylinder piston unit,
   and wherein said locking and release system permits said swivel plane of the arm to be adjusted around the axis of said cylinder piston and thereafter fixed.

2. The bead release device as claimed in claim 1 wherein said locking and release system includes a slider which slides in said curved slot and locking means to lock the position of the slider in the curved slot.

3. The bead release device as claimed in claim 2, wherein the locking and release system comprises a fork having a base through which the slide passes into the curved slot, and opposing sides which engages a pin therebetween on which the arm pivots, a movable plate element through which the slider also passes, located adjacent to the base and between opposite ends of the slider, and a cam parallel to the pin, said cam being movable against the plate element to a locking position in which the plate fixes the slider within the slot.

4. The bead release device as claimed in claim 1, wherein said curved slot is provided in a U-shaped piece fixed to said base.

5. The bead release device as claimed in claim 1, wherein said pneumatic cylinder-piston unit is connected to said base by a support which rotates about a first axis perpendicular to the swivel plane of the arm, and about a second axis perpendicular to said first axis so that said cylinder-piston unit axis lies within the swivel plane of the arm.

* * * * *